(12) United States Patent
Tomitsuka et al.

(10) Patent No.: US 7,133,947 B2
(45) Date of Patent: Nov. 7, 2006

(54) DATA COMMUNICATION SYSTEM, DATA COMMUNICATION METHOD, AND COMMUNICATION UNIT

(75) Inventors: Futoshi Tomitsuka, Iwaki (JP); Takashi Miyake, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 195 days.

(21) Appl. No.: 10/931,261

(22) Filed: Aug. 31, 2004

(65) Prior Publication Data

US 2005/0080944 A1    Apr. 14, 2005

(30) Foreign Application Priority Data

Sep. 5, 2003    (JP)    ............... 2003-313913

(51) Int. Cl.
*G06F 13/42* (2006.01)
(52) U.S. Cl. .................................... 710/106
(58) Field of Classification Search ............... None
See application file for complete search history.

(56) References Cited

U.S. PATENT DOCUMENTS 4,123,747 A * 10/1978 Lancto et al. ............... 713/185
4,747,100 A * 5/1988 Roach et al. ............... 370/452
5,551,068 A * 8/1996 Goldsmith et al. .......... 370/466
6,728,908 B1   4/2004 Fukuhara et al.
2003/0149756 A1 * 8/2003 Grieve et al. ............... 709/223

FOREIGN PATENT DOCUMENTS

| JP | 62-204634 | * | 9/1987 |
| JP | 09-265436 |  | 10/1997 |
| JP | 2001-290764 |  | 10/2001 |
| JP | 2003-122707 | * | 4/2003 |

* cited by examiner

*Primary Examiner*—Rehana Perveen
*Assistant Examiner*—Nimesh Patel
(74) *Attorney, Agent, or Firm*—Brinks Hofer Gilson & Lione

(57) ABSTRACT

A master provides a byte length of a frame in a certain position of the frame. The master also provides an error detection code in the final byte. After sending the final byte, the master monitors whether or not a negative acknowledgement is received. If a negative acknowledgment is received, the master transmits a dummy byte and then sends a stop condition. A slave counts the number of received bytes and compares the number of received bytes with the byte length of the frame. If the number of received bytes is larger than the byte length of the frame, the slave recognizes negative acknowledgement.

7 Claims, 8 Drawing Sheets

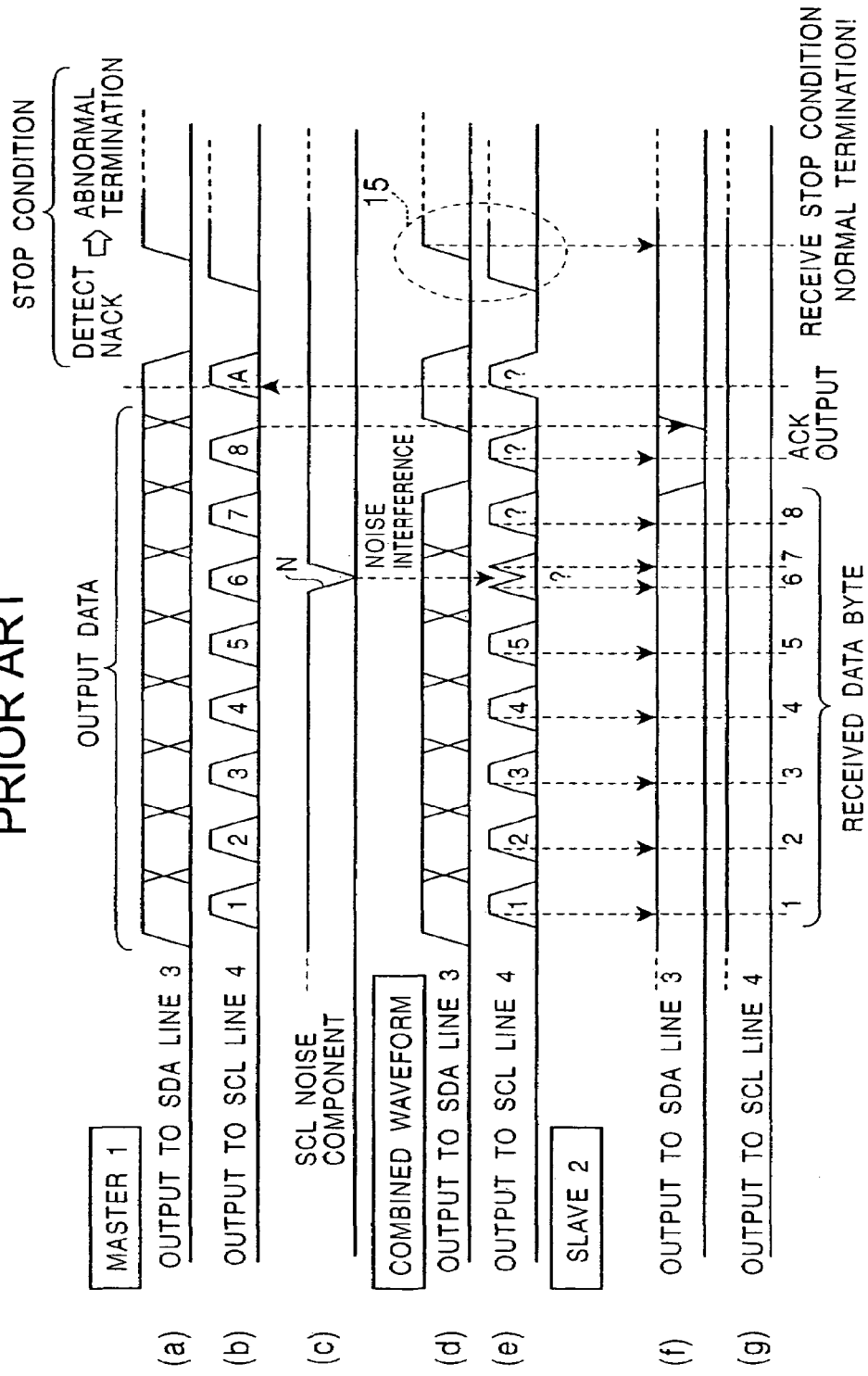

US 7,133,947 B2

DATA COMMUNICATION SYSTEM, DATA COMMUNICATION METHOD, AND COMMUNICATION UNIT

BACKGROUND OF THE INVENTION

1. Field of the Invention

The present invention relates to data communication methods used in serial data transfer systems, and more particularly, to a data communication method used in a serial data transfer system in which a master (sending unit) sends serial data to a slave (receiving unit) via, for example, an inter-integrated circuit ($I^2C$) bus.

2. Description of the Related Art

As shown in FIG. 5, in a serial data transfer system for sending serial data via an $I^2C$ bus, at least two units, a unit (master) 1, which is a sending unit, and a unit (slave) 2, which is a receiving unit, are connected to each other using a serial data line (SDA line) 3 for transferring data and a serial clock line (SCL line) 4 for transferring clock signals. In the master 1 and the slave 2, SD represents a data sending terminal, RD represents a data receiving terminal, SC represents a clock sending terminal, and RC represents a clock receiving terminal.

As shown in FIG. 6, the master 1 transfers a start condition S from the data sending terminal SD and the clock sending terminal SC via the SDA line 3 and the SCL line 4 such that a data signal SDA and a clock signal SCL have a predetermined first phase relationship at the start of a frame, and also transfers a stop condition P such that the data signal SDA and the clock signal SCL have a predetermined second phase relationship at the end of the frame. The master 1 transfers n-byte data in synchronization with clocks between the start condition S and the stop condition P.

The slave 2 detects the start condition S from the data receiving terminal RD and the clock receiving terminal RC to start reception of a frame, and sends an acknowledgement A from the data sending terminal SD to the master 1 via the SDA line 3 every time one byte of data is received. The slave 2 identifies the end of the frame from the stop condition P.

In other words, the master 1 sends the start condition S to the slave 2. Then, the master 1 sends a slave address as the first bit to the seventh bit, and sends a read/write control signal R/W as the eighth bit. After receiving an acknowledgement A sent from the slave 2 as the ninth bit, the master 1 transfers n bytes as transmission data, receives an acknowledgement A sent from the slave 2 every time one byte of data is transferred to the slave 2, and sends the stop condition P at the termination of data transfer.

FIG. 7 explains the levels (L: low level or H: high level) of signals output to the SDA line 3 and the SCL line 4 from each of the master 1 and the slave 2 when communication is performed via an $I^2C$ bus. When the master 1 performs transmission to the slave 2, the slave 2 outputs an "H" signal to the SDA line 3 and the SCL line 4, as shown in FIG. 7(b), and the master 1 outputs an "H" signal and "L" signal to the SDA line 3 and the SCL line 4 in accordance with data and a clock signal, as shown in FIG. 7(a). When one of the master 1 and the slave 2 outputs an "H" signal to a line, if the other of the master 1 and the slave 2 outputs an "L" signal, the line represents "L".

In other words, when the master 1 sends the start condition S, the SCL line 4 is "H" and the SDA line 3 is changed from "H" to "L". When the master 1 sends the stop condition P, the SCL line 4 is "H" and the SDA line 3 is changed from "L" to "H". Also, in order to receive an acknowledgement A, the master 1 outputs an "H" signal to the SDA line 3 as the ninth bit after sending a byte. In contrast, the slave 2 receives data sent from the master 1 to the SDA line 3 while outputting an "H" signal to the SDA line 3 and the SCL line 4, and outputs an "L" signal ("H" for NACK) to the SDA line 3 as the ninth bit after receiving the byte in order to send an acknowledgement A, as shown in FIG. 7(c). Also, after detecting the falling edge of the ninth clock bit, the slave 2 changes the SDA line 3 from "L" to "H". The slave 2 detects the stop condition P to complete reception of the frame.

Noise interference or a waveform distortion may cause a clock difference between a transmitter and a receiver. With such a difference between the transmitter and the receiver, the receiver may terminate reception processing normally even if the transmitter detects a communication error in the final byte of a communication frame.

FIG. 8 explains a state in which the master 1 recognizes abnormal termination but the slave 2 recognizes normal termination. When the sixth bit clock is regarded as two clocks due to interference of a noise component N, which is shown in FIG. 8 (c), in the SCL line 4, the slave 2 regards the normal seventh bit as the eighth bit. Then, if a frame is received successfully, the slave 2 outputs ACK (="L") to the SDA line 3. Thus, the slave 2 regards the normal eighth bit as the ninth bit. After detecting the falling edge of the ninth bit, the slave 2 outputs an "H" signal to the SDA line 3.

In contrast, the master 1 receives an "H" signal on the SDA line 3 as NACK at the normal ninth bit (A bit). Then, the master 1 sends the stop condition P. Since the slave 2 outputs an "H" signal to the SDA line 3 and the SCL line 4, the stop condition P represented by a dotted line 15 appears on the SDA line 3 and the SCL line 4. The slave 2 detects the stop condition P to normally terminate processing.

As described above, in the case where a receiver normally terminates reception processing although a transmitter recognizes abnormal termination causes the following problems:

1) inconsistency of operation as a system;
2) possibility of unintentional operation; and
3) possibility of malfunction.

For example, retransmission performed by a transmitter that terminates abnormally causes a problem described below. When an instruction for switching on a power supply is abnormally terminated, the transmitter resends the instruction to the receiver. Thus, the instruction for switching on the power supply is reported twice to the receiver. As a result of this, the receiver switches on the power supply in accordance with the first instruction, and then switches off the power supply in accordance with the second instruction. Thus, the receiver performs an operation that is not desired by the transmitter. Consequently, it is necessary for the receiver to recognize abnormal termination when the transmitter recognizes abnormal termination.

One approach for avoiding malfunction in $I^2C$ bus communication is disclosed, for example, in Japanese Unexamined Patent Application Publication No. 9-265436. In this approach, in order to avoid a malfunction caused when a master (microcomputer) reads or writes data from or to a slave (nonvolatile memory) when an SDA line is "L", the master performs an access operation after confirming that the slave releases a bus.

Also, a data transfer method for avoiding contention on a bus connecting a master to a slave is disclosed, for example, in Japanese Unexamined Patent Application Publication No. 2001-290764. In this approach, when the master performs transmission, the slave monitors whether or not data having a predetermined number of bytes is received from the master. When the data having the predetermined number of bytes is received, the data line is released, and the slave sends data to the master.

However, the known approaches described above do not solve the problems where the transmitter recognizes abnormal termination but the receiver recognizes normal termination.

SUMMARY OF THE INVENTION

Accordingly, it is an object of the present invention to make a receiver terminate abnormally when a transmitter recognizes abnormal termination but the receiver recognizes normal termination and to solve problems caused by the difference in recognition between the transmitter and the receiver.

The present invention relates to a data communication method used in a serial data transfer system including a sending communication unit; a receiving communication unit; a data line connecting the sending communication unit to the receiving communication unit for transferring data; and a clock line connecting the sending communication unit to the receiving communication unit for transferring a clock signal. The sending communication unit transfers n-byte data in synchronization with the clock signal, and transfers a stop condition such that a data signal and a clock signal have a predetermined phase relationship at the end of a frame. The receiving communication unit sends an acknowledgement to the sending communication unit via the data line every time the receiving communication unit receives one byte of data, and identifies the end of the frame in accordance with the stop condition.

In the data communication method, for sending a frame, a master provides a byte length of the frame in a certain position of the frame, monitors whether or not a negative acknowledgement is received after the sending communication unit sends the final byte, and transfers a dummy byte and then sends the stop condition when the master receives a negative acknowledgement. For receiving the frame, a slave counts the number of received bytes, compares the number of received bytes before receiving the stop condition with the byte length of the frame, and determines negative acknowledgement when the number of received bytes is larger than the byte length of the frame.

As described above, according to the present invention, even if a transmitter recognizes abnormal termination but a receiver would otherwise recognize a normal termination, sending a dummy byte to the receiver causes the receiver to automatically recognize abnormal termination. Thus, problems caused by a difference in recognition of a termination status can be avoided.

BRIEF DESCRIPTION OF THE DRAWINGS

FIG. 8 explains a state in which a transmitter recognizes abnormal termination but a receiver recognizes normal termination.

DETAILED DESCRIPTION OF THE PREFERRED EMBODIMENTS

Figure 1:
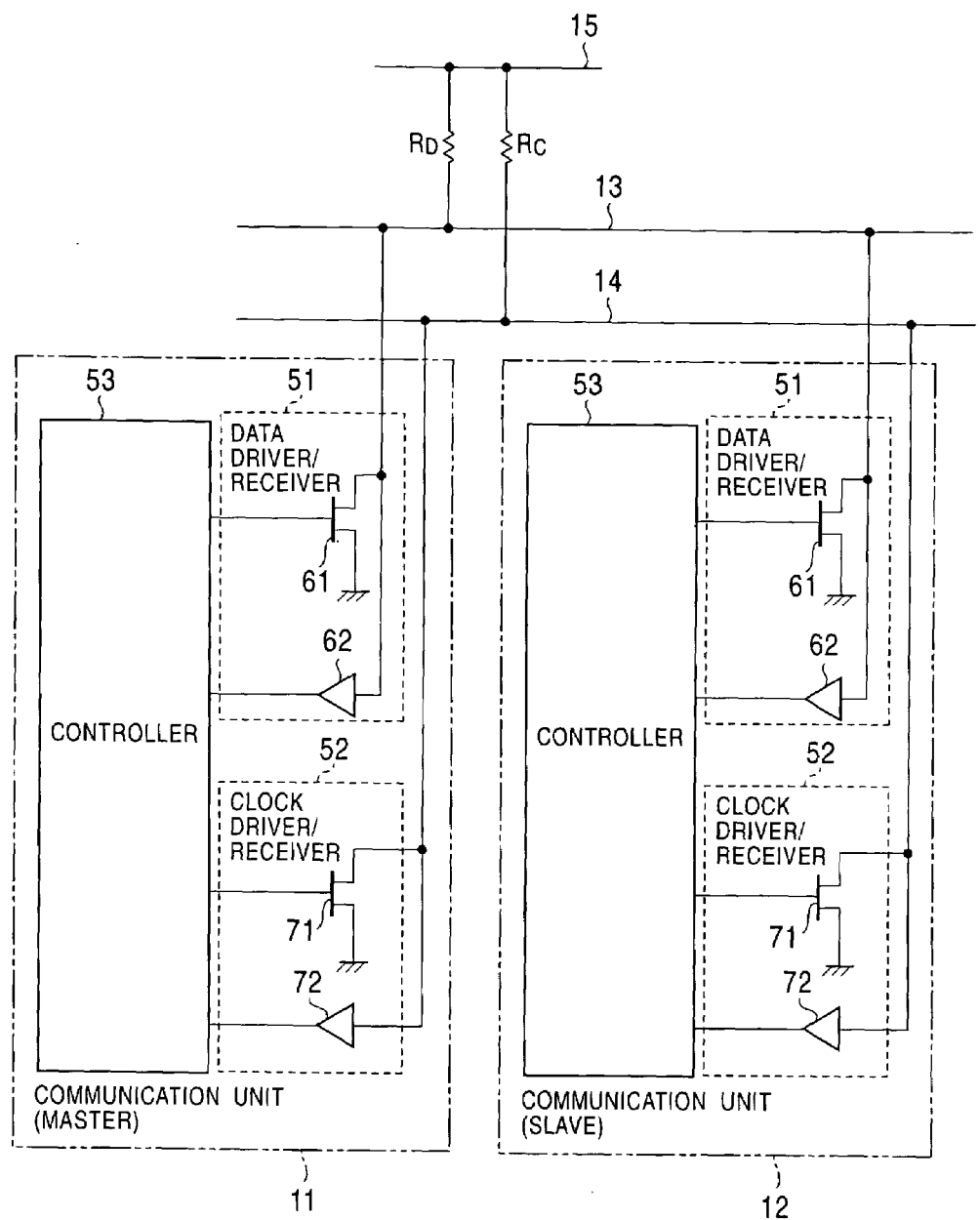
FIG. 1 shows the structure of a data transfer system according to the present invention.

FIG. 1 shows the structure of a data transfer system according to the present invention. A communication unit (master) 11, which is a sending unit, and a communication unit (slave) 12, which is a receiving unit, communicate with each other via an inter-integrated circuit (I²C) bus.

An SDA line (data line) 13 and an SCL line (clock line) 14 are connected to a power supply line 15 through resistors RD and RC, respectively. The master 11 and the slave 12 have the same structure. Each of the master 11 and the slave 12 includes a data driver/receiver 51, a clock driver/receiver 52, and a controller 53. The data driver receiver 51 is connected to the SDA line 13. The data driver/receiver 51 includes an N-channel metal oxide semiconductor (MOS) transistor (NMOS transistor) 61 for driving the SDA line 13 high or low and a buffer amplifier 62 for reading the level ("H" or "L") of the SDA line 13.

The clock driver/receiver 52 is connected to the SCL line 14. The clock driver/receiver 52 includes an NMOS transistor 71 for driving the SCL line 14 high or low and a buffer amplifier 72 for reading the level ("H" or "L") of the SCL line 14.

The controller 53 of the slave 12 turns off the NMOS transistors 61 and 71 so that "L" does not appear on the SDA line 13 and the SCL line 14. At a point in time (for the ninth bit) when the slave 12 sends an acknowledgement A to the master 11 every time it receives a byte, the controller 53 of the master 11 turns off the NMOS transistor 61 so that "L" does not appear on the SDA line 13.

For data transmission, the controller 53 of the master 11 turns on or off the NMOS transistors 61 and 71 in accordance with data and a clock, respectively, to cause "H" or "L" to appear on the SDA line 13 and the SCL line 14 in accordance with the data and the clock signal. The controller 53 of the slave 12 reads data and a clock signal at the "H" or "L" level on the SDA line 13 and the SCL line 14 via the buffer amplifiers 62 and 72, respectively. Also, the controller 53 of the slave 12 causes "H" or "L" (acknowledgement A) to appear on the SDA line 13 at the ninth bit every time a byte is received. The controller 53 of the master 11 reads the acknowledgement A or ACK/NACK at the "H" or "L" level on the SDA line 13 via the buffer amplifier 62.

Figure 2:
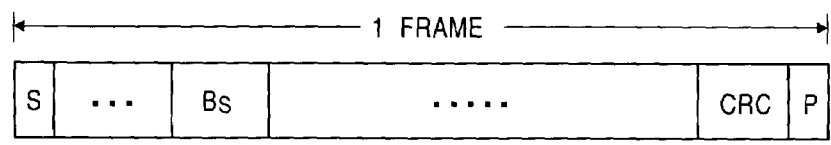
FIG. 2 explains the structure of a frame in the present invention.

FIG. 2 explains the structure of a frame in the present invention. A start condition S is provided at the start, and a stop condition P is provided at the end. A length byte identifying a byte length Bs of a frame is provided in a certain position of the frame. An error detection byte (for example, a cyclic redundancy code (CRC) check byte) is provided in the final byte.

FIRST EMBODIMENT

When, for example, generation of clock noise N causes the sixth clock to be regarded as two clocks, a slave terminates normally although a master recognizes abnormal termination. In the first embodiment, when the master recognizes abnormal termination but the slave recognizes normal termination, sending a dummy byte from the master to the slave and causing inconsistency of the byte length in the slave causes the slave to automatically terminate abnormally.

Figure 3:
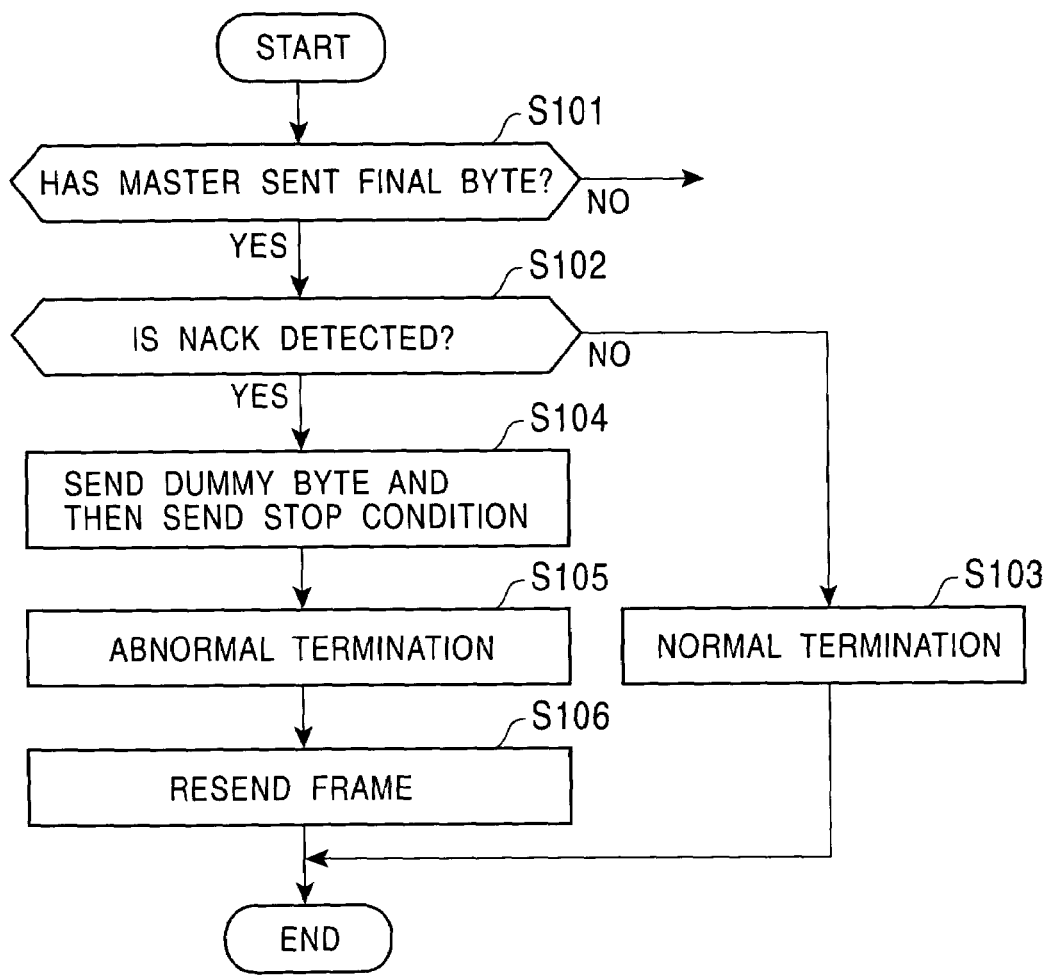
FIG. 3 is a flowchart showing a process performed by a controller of a master.
Figure 4:
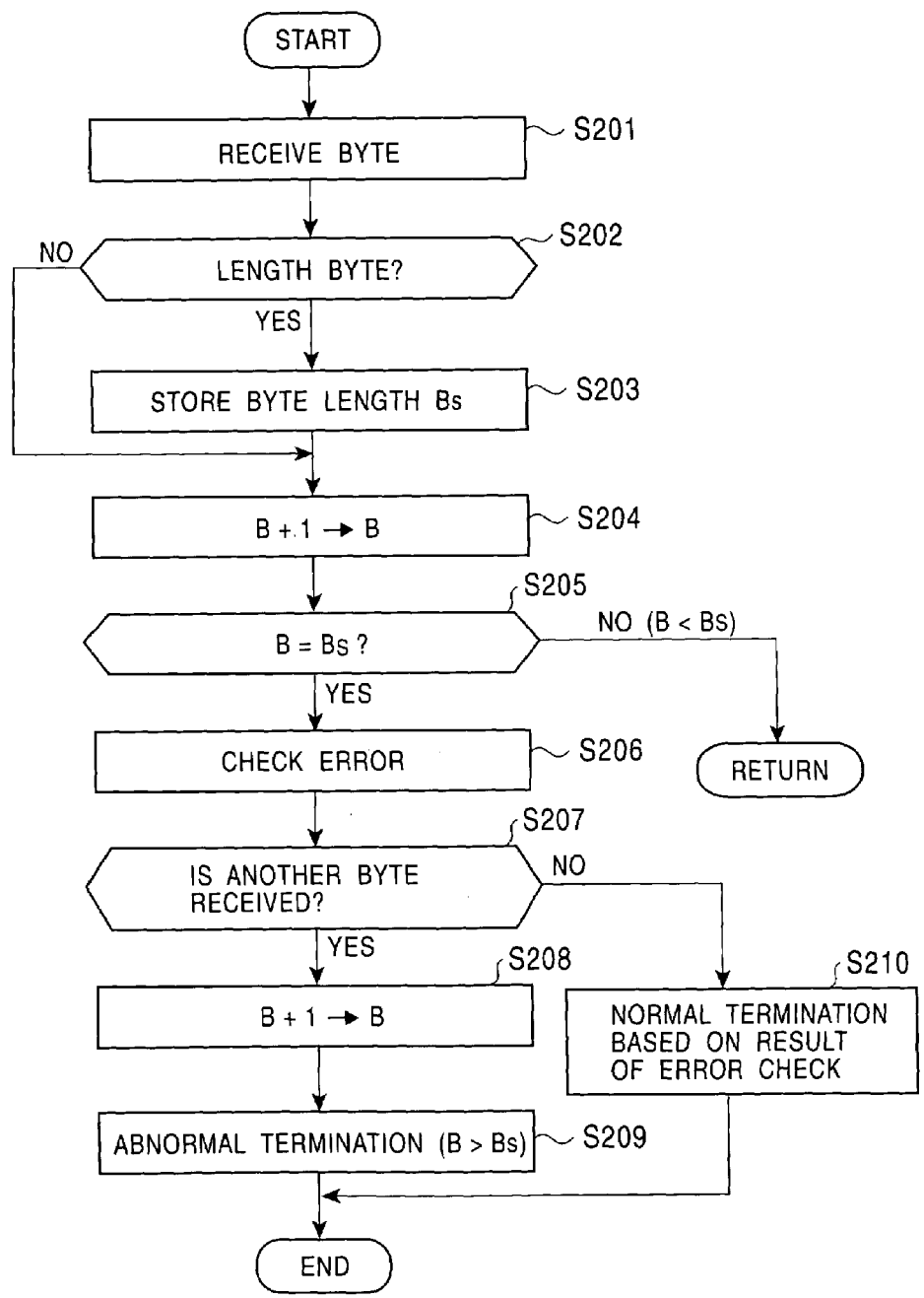
FIG. 4 is a flowchart showing a process performed by a controller of a slave.
Figure 5:
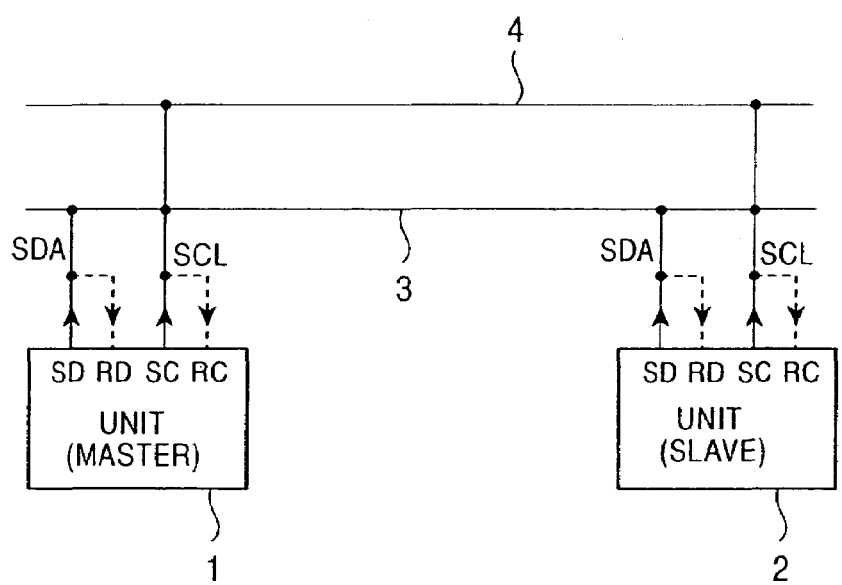
FIG. 5 is a conceptual drawing of a serial data transfer system for sending serial data via an I²C bus.
Figure 6:
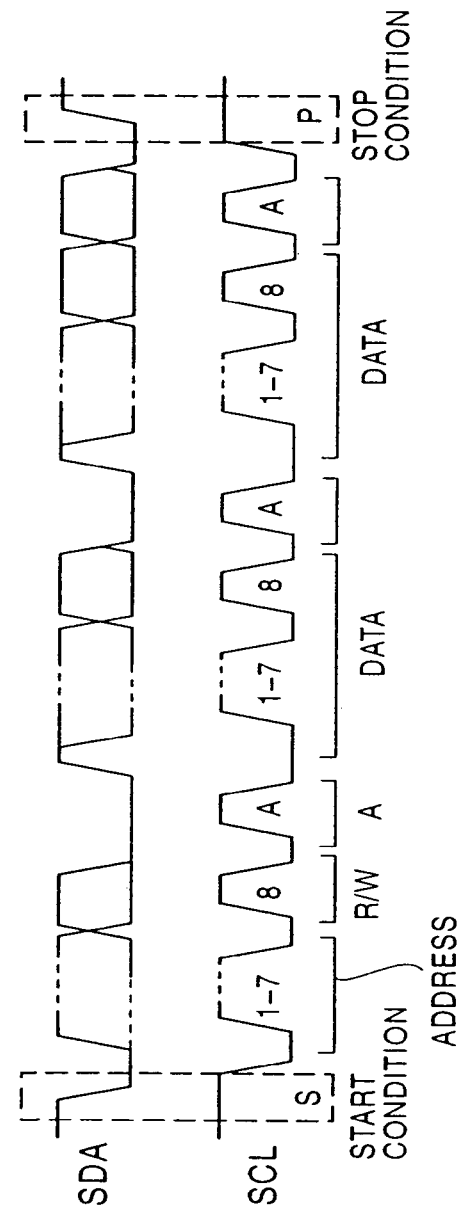
FIG. 6 shows an example of the structure of a frame.
Figure 7:
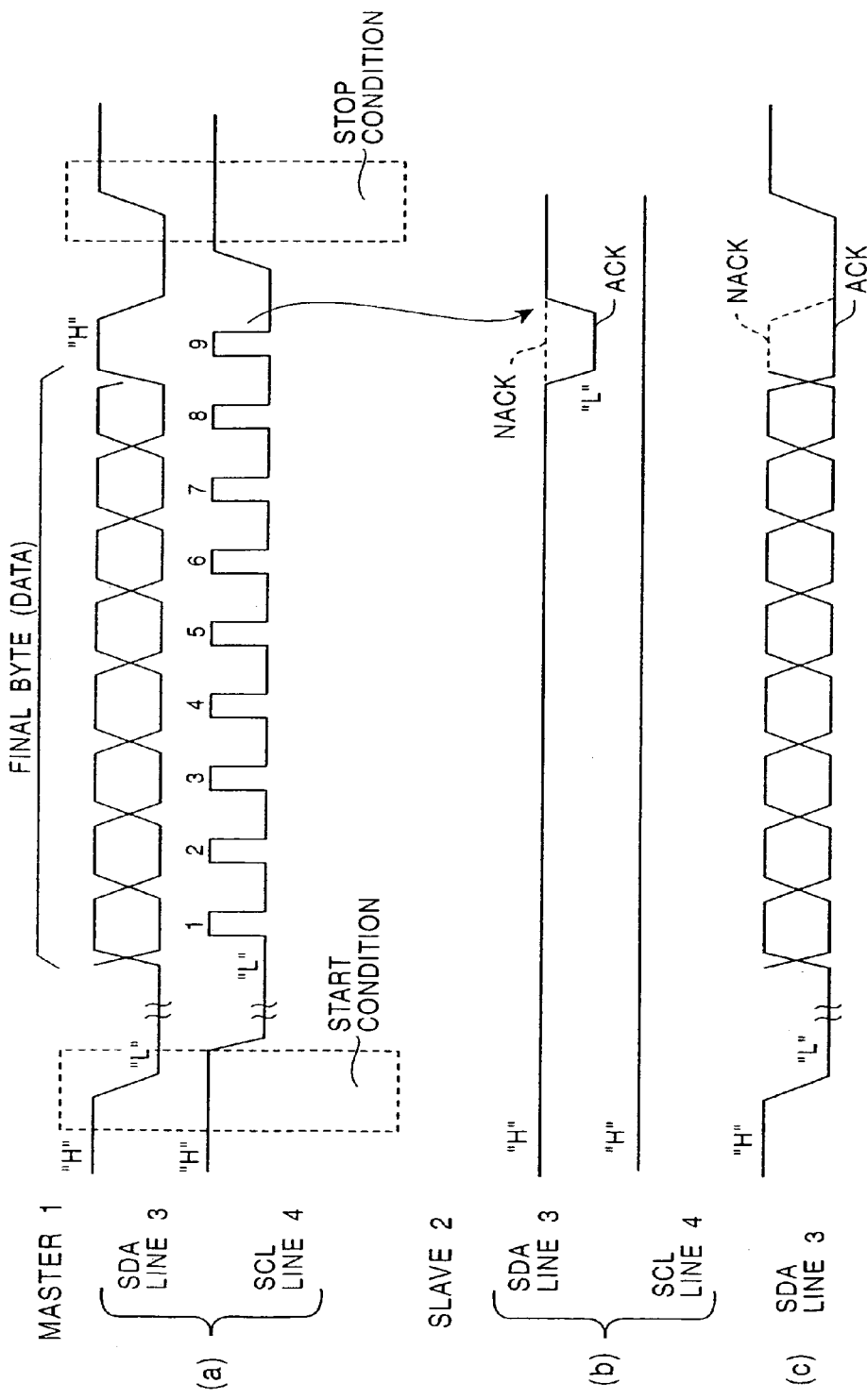
FIG. 7 explains the levels ("L": low or "H": high) of signals output from each of the master and the slave to an SDA line and an SCL line during communication via the I²C bus.

FIG. 3 is a flowchart showing a process performed by the controller 53 of the master 11. FIG. 4 is a flowchart showing a process performed by the controller 53 of the slave 12.

The controller 53 of the master 11 checks whether or not the master 11 has sent the final byte (step S101). If the master 11 has not sent the final byte, other processing is performed. If the master 11 has sent the final byte, the controller 53 of the master 11 checks whether or not NACK (="H") is detected at the ninth bit after sending the final byte (step S102). If ACK is detected, the controller 53 of the master 11 determines normal termination, and the process ends (step S103).

If NACK is detected, the controller 53 of the master 11 sends a dummy byte and then sends a stop condition P (step S104) because the slave 12 may otherwise recognize normal termination. After sending the stop condition P, the master 11 terminates abnormally (step S105). Then, the controller 53 of the master 11 resends the frame (step S106).

In contrast, every time the controller 53 of the slave 12 receives a byte constituting a frame from the master 11 (step S201), the controller 53 of the slave 12 determines whether or not the byte is a length byte (step S202). If the length byte is received, the controller 53 of the slave 12 stores a frame byte length Bs (step S203). Then, the controller 53 of the slave 12 increments the number B of received bytes by one (B+1→B) (step S204), and checks whether or not the number B is equal to the frame byte length Bs (step S205). If the number B is smaller than the frame byte length Bs, the process returns to step S201. The controller 53 of the slave 12 receives the next frame byte and repeats the subsequent steps.

If the number B is equal to the frame byte length Bs, in other words, if an error check byte, which is the final byte, is received (in step S205), an error is checked for, and the result of error checking is sent and stored (step S206). Then, the controller 53 of the slave 12 monitors whether or not another byte (dummy byte) is received from the master 11 (step S207). If another byte is received, the number B of received bytes is incremented by one (B+1→B) (step S208). As a result of this, the number B of received bytes is larger than the reported frame byte length Bs. Thus, the controller 53 of the slave 12 determines abnormality, and the slave 12 terminates abnormally (step S209).

If a dummy byte is not received, the slave 12 terminates normally based on the result of error checking (in this case, actually normal) stored in step S206 (step S210).

As described above, according to the present invention, even if a transmitter recognizes abnormal termination but a receiver would otherwise recognize a normal termination, the receiver automatically recognizes abnormal termination. Thus, problems caused by a difference in recognition of a termination status can be avoided.

What is claimed is:

1. A serial data transfer system comprising a sending communication unit; a receiving communication unit; a data connection connecting the sending communication unit to the receiving communication unit for transferring data; and a clock connection connecting the sending communication unit to the receiving communication unit for transferring a clock signal, wherein:

the sending communication unit transfers n-byte data in synchronization with the clock, and transfers a stop condition at the end of a frame;

the receiving communication unit sends an acknowledgement to the sending communication unit via the data connection every time the receiving communication unit receives one byte of data, and identifies the end of the frame in accordance with the stop condition;

when the sending communication unit sends the frame, the sending communication unit provides a byte length of the frame, and monitors whether or not a negative acknowledgement is received after the sending communication unit sends the final byte;

when the sending communication unit receives a negative acknowledgement, the sending communication unit transfers a dummy byte and then sends the stop condition;

when the receiving communication unit receives the frame, the receiving communication unit counts the number of received bytes and compares the number of received bytes with the byte length of the frame; and when the number of received bytes is larger than the byte length of the frame, the receiving communication unit determines the negative acknowledgement.

2. The serial data transfer system according to claim 1, wherein when the sending communication unit receives the negative acknowledgement after sending the final byte, after the sending communication unit transfers the dummy byte and then sends the stop condition, the sending communication unit resends the frame that failed to be transferred.

3. The serial data transfer system according to claim 1, wherein the serial data transfer system performs communication via an inter-integrated circuit bus.

4. A data communication method used in a serial data transfer system including a sending communication unit; a receiving communication unit; a data connection connecting the sending communication unit to the receiving communication unit for transferring data; and a clock connection connecting the sending communication unit to the receiving communication unit for transferring a clock signal, the sending communication unit transferring n-byte data in synchronization with the clock and transferring a stop condition at the end of a frame, the receiving communication unit sending an acknowledgement to the sending communication unit via the data connection every time the receiving communication unit receives one byte of data and identifying the end of the frame in accordance with the stop condition, the data communication method comprising:

providing, by the sending communication unit sending the frame, a byte length of the frame, monitoring whether or not a negative acknowledgement is received after the sending communication unit sends the final byte, and transferring a dummy byte and then sending the stop condition when the sending communication unit receives a negative acknowledgement; and counting, by the receiving communication unit receiving the frame, the number of received bytes, comparing the number of received bytes with the byte length of the frame, and determining the negative acknowledgement when the number of received bytes is larger than the byte length of the frame.

5. A sending communication unit in a serial data transfer system including the sending communication unit; a receiving communication unit; a data connection connecting the sending communication unit to the receiving communication unit for transferring data; and a clock connection connecting the sending communication unit to the receiving communication unit for transferring a clock signal, the sending communication unit transferring n-byte data in synchronization with the clock and transferring a stop condition at the end of a frame, the receiving communication unit sending an acknowledgement to the sending communication unit via the data line every time the receiving communication unit receives one byte of data and identifying the end of the frame in accordance with the stop condition, wherein when the sending communication unit sends the frame, the sending communication unit provides a byte length of the frame, and monitors whether or not a negative acknowledgement is received after the sending communication unit sends the final byte; and when the sending communication unit receives a negative acknowledgement, the sending communication unit transfers a dummy byte and then sends the stop condition.

6. The sending communication unit according to claim 5, wherein when the sending communication unit receives the negative acknowledgement after sending the final byte, after the sending communication unit transfers the dummy byte and then sends the stop condition, the sending communication unit resends the frame that failed to be transferred.

7. The sending communication unit according to claim 5, wherein the serial data transfer system performs communication via an inter-integrated circuit bus.

\* \* \* \* \*